(12) United States Patent
Heyde et al.

(10) Patent No.: US 6,348,105 B1
(45) Date of Patent: Feb. 19, 2002

(54) CLEANABLE COATING APPARATUS AND METHOD OF CLEANING THE SAME WITH HOT WATER

(75) Inventors: Hans Heyde, Wallenhorst; Horst Häring, Derenburg; Reiner Hochapfel, Wernigerode, all of (DE)

(73) Assignee: Sollich GmbH & Co. KG, Bad Salzuflen (DE)

( * ) Notice: Subject to any disclaimer, the term of this patent is extended or adjusted under 35 U.S.C. 154(b) by 0 days.

(21) Appl. No.: 09/422,586

(22) Filed: Oct. 21, 1999

(30) Foreign Application Priority Data

Oct. 22, 1998 (DE) .......................................... 198 48 766
May 4, 1999 (DE) .......................................... 199 20 589

(51) Int. Cl.⁷ ............................................... B08B 7/00
(52) U.S. Cl. ................................ 134/19; 134/1; 134/5; 134/32; 134/42; 134/95.1; 134/95.2; 118/13; 118/70; 118/323; 118/16; 118/25; 118/314; 510/218
(58) Field of Search ............................. 134/95.1, 95.2, 134/19, 1, 5, 32, 42; 118/13, 70, 323, 16, 25, 314; 510/218

(56) References Cited

U.S. PATENT DOCUMENTS

| | | | | |
|---|---|---|---|---|
| 4,420,854 A | * | 12/1983 | Newton ........................ | 15/302 |
| 5,163,486 A | * | 11/1992 | Rogers et al. ................. | 141/89 |
| 5,437,723 A | * | 8/1995 | Sollich ......................... | 118/21 |
| 6,143,087 A | * | 11/2000 | Walter ........................... | 134/1 |

FOREIGN PATENT DOCUMENTS

DE    42 43 814 C1    12/1992

* cited by examiner

Primary Examiner—Randy Gulakowski
Assistant Examiner—Michael Kornakov
(74) Attorney, Agent, or Firm—Thomas, Kayden, Horstemeyer & Risley LLP

(57) ABSTRACT

A method of cleaning a coating apparatus for coating articles with chocolate masses and the like with hot water includes the steps of: filling water into a tub of the coating apparatus, wherein the coating apparatus includes a driven grating conveyer belt for receiving the articles to be coated including an upper portion and a lower portion, and wherein the coating apparatus includes at least one aggregate being arranged in the upper region of the tub; pumping water out of the tub with at least one pump; and directing the substantially unpressurized water onto the grating conveyer belt and onto the at least one aggregate to be cleaned, the water having a temperature being higher than the melting temperature of the mass, the water flowing over the grating conveyer belt and the at least one aggregate and back into the tub in a substantially unpressurized manner.

A coating apparatus (1) for coating articles with chocolate masses and the like being cleanable with substantially unpressurized hot water includes a frame (2) and a grating conveyer belt (8) for receiving the articles to be coated. The grating conveyer belt (8) is arranged within the frame (2). It has an upper portion (9) and a lower portion (10). It is rotatingly driven and guided by deflecting elements (13). A tub (6) includes a side wall (41) extending beyond the upper portion (9) of the grating conveyer belt (8). At least one aggregate is arranged in the upper region (9) of the tub (6).

14 Claims, 5 Drawing Sheets

CLEANABLE COATING APPARATUS AND METHOD OF CLEANING THE SAME WITH HOT WATER

CROSS REFERENCE TO RELATED APPLICATIONS

This application claims the benefits of co-pending German patent application number 198 48 766.5 entitled "Verfahren zum Reinigen einer Überziehmaschine sowie reinigbare Überziehmaschine", filed on Oct. 22, 1998, and of co-pending German patent application number 199 20 589.2 entitled "Verfahren zum Reinigen einer Überziehmaschine sowie reinigbare Überziehmaschine", filed on May 4, 1999.

FIELD OF THE INVENTION

The present invention generally relates to a method of cleaning a coating apparatus for coating articles with chocolate masses and the like with hot water. The present invention also relates to a coating apparatus for coating articles with chocolate masses and the like being cleanable with substantially unpressurized hot water.

BACKGROUND OF THE INVENTION

Generally, a coating apparatus serves to coat articles being located on a driven grating conveyor belt with tempered chocolate mass. Surplus chocolate flows through the coating apparatus and through the grating conveyor belt. The chocolate mass or the similar mass gets in contact to a majority of the elements of the coating apparatus, and it sticks to these elements. The coating apparatus includes a coating station in which melted liquid chocolate freely falls down onto the articles to be coated. The coating apparatus also includes a base coating station for coating the bottom sides of the articles. Furthermore, it includes a fan to blow surplus chocolate off the articles. Other masses than chocolate, for example fat containing masses, frosting masses, caramel masses and the like may also be processed in such a coating apparatus.

In case of a change of the mass in the coating apparatus, for example, when dark chocolate has been processed first and the following articles will have to be covered with light chocolate or even a white coating mass, there is the problem of removing the first mass from the coating apparatus, and to clean all elements of the coating apparatus that did get in contact to the mass. It is necessary to clean these elements of the coating apparatus before the new mass, for example the white coating mass, enters the coating apparatus.

To conduct such a change of the mass, it is known in the art to heat the coating apparatus up with the first mass, and to remove the first mass from the coating apparatus. The first mass is pumped out of the coating apparatus by a return pump. After the first mass has been pumped out of the coating apparatus, the interior of the coating apparatus and all aggregates and elements being arranged inside the coating apparatus and being accessible are mechanically cleaned. This means that the rests of the first mass are removed from the coating apparatus with tools, for example with a spattle. The mechanical removal of the chocolate mass takes a lot of time, and it is hard to get access to all the aggregates and elements being arranged in the interior of the coating apparatus. Additionally, the coating apparatus is not thoroughly cleaned, so that a second cleaning step has to be conducted. In this second cleaning step, either pressurized water or cocoa butter is utilized.

It is also known in the art to clean a coating apparatus utilizing pressurized water. A common cleaning device utilizing highly pressurized water is used to apply water onto the aggregates and elements of the coating apparatus at extremely high pressures. The rest of the mass sticking to the aggregates and elements of the coating apparatus are removed due to the pressure of the water. Practically, this method is also based on a mechanical cleaning effect, and it is only successful as long as the aggregates and elements to be cleaned are directly accessible to the water jet. The water being used in the cleaning device may be hot, but it quickly cools down soon after it exits through the nozzle of the cleaning device. Consequently, such a cleaning device utilizing highly pressurized water is not capable of substantially increasing the temperature of the aggregates and elements of the coating apparatus to be cleaned. Additionally, hardly accessible locations in the coating apparatus, for example the bottom side of shafts, rollers, protrusions and the like, are not thoroughly cleaned. Due to the great velocity of the pressurized water, the mass tends to be washed off and spray onto inaccessible locations in the coating apparatus. Utilizing the pressurized water makes it necessary to conduct a drying operation afterwards. The pressure cleaning device consumes a lot of water since the water tends to flow and spray out of the coating apparatus, and consequently, it cannot be reused. Consequently, a discharge opening for the water has to be arranged below the coating apparatus. The application of a cleaning device utilizing hot pressurized water makes it necessary to continuously feed the device with hot water resulting in a high consumption of energy and increased costs. The operating staff conducting the cleaning action has to wear appropriate clothing and safety goggles. Utilizing water at a high pressure also results in the operation time of bearings, shafts and other aggregates and elements being reduced since the lubricant material is at least partly removed.

To overcome the above described disadvantages of cleaning a coating apparatus with water at high pressures, it is known in the art to use a cleaning mass, for example cocoa butter or another fat containing mass. The cleaning mass is introduced into the coating apparatus, and the coating apparatus is actuated without articles being located on the grating conveyor belt. The cleaning mass circulates through the coating apparatus, for example, it flows through a coating station. The cleaning mass gets in contact to some aggregates and elements of the coating apparatus to which chocolate mass sticks, and the cleaning mass cleans these aggregates and elements more or less by melting at least parts of the chocolate off the coating apparatus. Nevertheless, not all aggregates and elements of the coating apparatus to be cleaned get in contact to the cleaning mass, so that the cleaning effect is insufficient. At the end of the cleaning process, the cleaning mass exits the coating apparatus, and, for example, it is used in the normal chocolate production process. Next, the new coating mass is introduced into the coating apparatus.

It is also known in the art to form all essential aggregates and elements of the coating apparatus of stainless steel, and to clean the coating apparatus with hot pressurized water after the first mass has exited the coating apparatus. Due to the great velocity and the high speed of the water contacting the aggregates and elements to be cleaned, the water tends to spray. Especially, when the water contacts the grating conveyor belt, the aggregates being arranged below the upper portion of the grating conveyor belt are not thoroughly cleaned. Due to the hot water, a contamination of the coating apparatus occurs. The contamination has the effect that there is a great danger of bacteria. To prevent this danger, it is known to dry the coating apparatus by blowing hot air onto its aggregates and elements after the cleaning operation. Nevertheless, not all aggregates and elements of the coating apparatus are sufficiently dried, and it is not possible to check if all aggregates and elements are really dry.

It is also known in the art to cut open the grating conveyor belt transverse to its conveying direction, to open the grating conveyor belt in this way, and to clean the aggregates and elements being arranged below the upper portion of the grating conveyor belt. For this cleaning action, cleaning masses have to be used. The cleaning mass is either cocoa butter or hot pressurized water. Additionally, it takes a lot of time to cut the grating conveyor belt and to put it together again after the cleaning action.

A cleanable coating apparatus is known from German Patent No. DE 42 43 814 C1. The coating apparatus includes a clamping device to lift the grating conveyor belt. The grating conveyor belt may be supported in its raised position. In the raised position of the grating conveyor belt, the aggregates and elements being arranged below the upper portion of the grating conveyor belt are accessible to a cleaning mass. Consequently, it is easier and faster to clean the aggregates and elements when the grating conveyor belt is lifted. The aggregates and elements are accessible from the side.

SUMMARY OF THE INVENTION

Briefly described, the present invention provides a method of cleaning a coating apparatus for coating articles with chocolate masses and the like with hot water. The present invention also provides a coating apparatus for coating articles with chocolate masses and the like being cleanable with hot water.

More particularly, the method according to the present invention includes the steps of filling water into a tub of the coating apparatus, wherein the coating apparatus includes a driven grating conveyer belt for receiving the articles to be coated including an upper portion and a lower portion, and wherein the coating apparatus includes at least one aggregate being arranged in the upper region of the tub; pumping water out of the tub with at least one pump; and directing the substantially unpressurized water onto the grating conveyer belt and onto the at least one aggregate to be cleaned, the water having a temperature being higher than the melting temperature of the mass, the water flowing over the grating conveyer belt and the at least one aggregate and back into the tub in a substantially unpressurized manner.

The coating apparatus for coating articles with chocolate masses and the like being cleanable with substantially unpressurized hot water includes a frame, a grating conveyer belt for receiving the articles to be coated, the grating conveyer belt being arranged within the frame, having an upper portion and a lower portion, being rotatingly driven and being guided by deflecting elements, a tub including a side wall extending beyond the upper portion of the grating conveyer belt, and at least one aggregate being arranged in the upper region of the tub.

The present invention is based on the idea of cleaning a coating apparatus utilizing substantially unpressurized hot water. The substantially unpressurized hot water does not have a spraying effect when it contacts the aggregates and elements of the coating apparatus to be cleaned, but instead, it thoroughly cleans the aggregates and elements to be cleaned by providing a substantially unpressurized or pressureless cleaning and rinsing action. After the chocolate mass or a similar mass has been pumped out of the coating apparatus, water is filled into the tub of the coating apparatus. Preferably, the water is already hot, and it has a temperature being higher than the melting temperature of the mass. Nevertheless, it is also possible to fill cold or warm water into the tub, and to heat up the cold or warm water until it reaches the desired increased temperature. The entire coating apparatus, or at least the aggregates and elements getting in contact to the hot water, approximately have the same temperature as the hot water. The hot water circulates and flows over the aggregates and elements to be cleaned at a low pressure, the water being circulated by one or more pump and one or more hose. The essential aggregates and elements of the coating apparatus to be cleaned may be driven during the cleaning process. The hot water is distributed over the aggregates and elements to be cleaned by the operating staff in a sensitive manner. The rests of the mass are melted, and they are washed away by the water. This is also true for hardly accessible locations in the coating apparatus. The water is circulated in the coating apparatus, i.e. the discharge opening of the tub is closed during the cleaning action. The cleaning and rinsing action takes place until all aggregates and elements have been thoroughly cleaned. The period of time of the rinsing and cleaning action may be based on experience. For example, the period of time may depend on the kind of the mass that has to be removed from the coating apparatus. The novel method of cleaning a coating apparatus is extremely thorough, and it takes less time compared to the methods known in the prior art. With the novel method, it is possible to clean the entire upper portion of the grating conveyor belt including the deflection elements. For this reason, the tub of the coating apparatus may be filled with water up to a level such that the upper portion of the grating conveyor belt is located below the water level. Due to the permanent contact of the water and the elements and aggregates to be cleaned, the cleaning action is more intense and faster than it is known in the prior art.

The double housing or the double shell of the tub may be heated up to a temperature such that the water has a temperature above the melting temperature, i.e. the melting point of the mass. The double housing prevents the water being contained inside the coating apparatus from cooling down during the cleaning and the rinsing action.

It is possible to add a solvent, especially a fat solvent, to the water to improve the cleaning effect. With this solvent, the chocolate mass is not only melted, but it is also solved.

The water may be excited by ultrasonic waves being introduced into the water during the cleaning and the rinsing action. The ultrasonic waves may be introduced into the water at one or more places at the same time. For this reason, one or more ultrasonic transmitter or sonotrode is mounted in the coating apparatus, or it is easily mountable in the coating apparatus. The ultrasonic transmitter is located below the maximum water level.

The hot water may be filled into the tub at a temperature of approximately 45 degrees Celsius. 45° C. (113 degrees Fahrenheit) is above the usual melting temperature of the chocolate mass. Nevertheless, it is also possible to fill colder water into the tub, and to heat the water up by the double housing of the tub. Preferably, the water circulating through the coating apparatus at least has a temperature of 45° C. to have the desired melting effect. At such a temperature, all crystals are liquefied. The driving roller of the grating conveyor belt and the deflecting elements being arranged in the upper region of the grating conveyor belt are elements on which a lot of mass deposits. To thoroughly clean these elements, it is necessary to raise the water level compared to the mass level during the normal operation of the coating apparatus. After the coating apparatus is clean, the dirty and contaminated water is pumped out of the coating apparatus. The water may be pumped out the coating apparatus by the return pump or by a separate water pump.

Following to the washing and cleaning action with the hot water, the essential aggregates and elements of the coating apparatus may be heated up with hot-water of approximately 65 to 80 degrees Celsius. After removing the hot-water from the coating apparatus, the aggregates and elements of the coating apparatus dry due to a vaporization reaction. For this reason, the fan of the coating apparatus may be used to blow air over the aggregates and elements and through the grating conveyor belt while the double housing of the tub is still heated. The coating apparatus is still heated during the drying operation. The entire rinsing, cleaning and drying action takes approximately three hours. The drying operation takes approximately half an hour. In the case of using ultrasonic transmitters, the period of time may be reduced to approximately one and a half hours.

To also clean the base coating station of the coating apparatus, it may be necessary to replace the conduit leading to the curtain case by a pipe bend being directed into the base case of the base coating station, and to actuate the drive of the curtain pump. Thus, the curtain pump usually serving to convey the mass to the curtain case is used as conveying pump for the hot water serving to clean the base coating station. It is understood that the base coating station is also actuated during its cleaning. The heating of the double housing is also actuated during the cleaning process. It may make sense that the heating has more heating power than necessary for the normal operation of the coating apparatus to direct heat to the water via the double housing of the coating apparatus to an increased extent. In this way, it is ensured that the hot water does not cool down during the cleaning action, but it instead is kept at the temperature necessary to melt the mass.

Following to the washing and rinsing action, a drying action may be conducted. Therefore, the fan of the coating apparatus is used to blow air over the aggregates and elements and through the grating conveyor belt while the double housing is still heated. The coating apparatus remains heated during this drying action. The grating conveyor belt, the curtain pump and the mixing screw are driven while the coating apparatus is dried. The conduit connecting the coating apparatus to the return pump may be removed. The fan of the coating apparatus is driven at an increased speed. The air being sucked in by the fan may be ambient air. The entire cleaning, rinsing and drying action takes approximately two hours. The drying action takes approximately half an hour.

The cleanable coating apparatus for processing chocolates and similar masses works with water. It includes a frame and a rotatingly driven grating conveyor belt arranged therein to carry the articles to be coated. The grating conveyor belt is guided and supported by deflecting elements. Aggregates are arranged in the upper region of the tub of the coating apparatus, especially a base coating station including a base case and a vibration apparatus being arranged below the upper portion of the grating conveyor belt. A curtain case and a fan are arranged above the upper portion of the grating conveyor belt. The novel coating apparatus includes a side wall being designed and arranged to extend beyond the upper region of the grating conveyor belt in an upward direction. Thus, all elements being arranged above the driving shaft, especially the upper portion of the grating conveyor belt including the deflecting elements, are arranged below the water level such that they are also cleaned during the cleaning and rinsing action of the cleanable coating apparatus. All elements contacting the chocolate mass are permanently covered by water.

The tub of the coating apparatus may include a level sensor for the water being arranged in the upper portion of the grating conveyor belt. With the level sensor, it is possible to fill the tub of the coating apparatus up to the desired water level such that all elements and aggregates to be cleaned are located below the water level. The filling process may be automatically controlled and ended by the level sensor. Once the tub of the coating apparatus is sufficiently filled with water, this is sufficient to clean the entire coating apparatus. Nevertheless, there may be a second cleaning process using a second charge of water. For example, the first and/or the second filling of water may include a cleaning or disinfecting substance or a solvent.

One or more ultrasonic transmitter may be arranged in the tub of the coating apparatus below the maximum water level. The ultrasonic transmitter may be fixedly arranged in the coating apparatus. On the other hand, it is also possible to design the ultrasonic transmitter to be easily attachable to the coating apparatus to enable its mounting to different locations in the coating apparatus.

The coating apparatus may include a special water pump to circulate the hot water and the hot-water of approximately 65 to 80° C. The water pump may be fixedly arranged in the coating apparatus. On the other hand, it is also possible to use the return pump of the coating apparatus to circulate the water during the cleaning and rinsing action.

The thorough cleaning action using hot water takes less time and is more thorough than it is known in the prior art. Additionally, there is no danger of the operation staff getting dirty. The coating apparatus may be also cleaned at a location where no water discharge outlet is provided. At the end of the cleaning operation, the water including the melted mass may be pumped out of the coating apparatus into a reservoir or into a discharge channel by the return pump.

The tub of the coating apparatus may include a level sensor for the filling of the hot water, the level sensor being arranged above the driving roller of the grating conveyor belt. The curtain case and the conduit leading to the curtain case may be designed and arranged to be easily detachable from the coating apparatus. In this way, it is possible to fill the tub of the coating apparatus up to the desired water level such that the driving roller of the grating conveyor belt is located below the water level. The filling may be automatically controlled and ended, respectively, by the level sensor. One filling may be sufficient to clean the entire coating apparatus. On the other hand, a second filling of hot water may be used, the second filling for example including a cleaning substance or a disinfecting substance.

During the cleaning operation the driven elements and aggregates of the coating apparatus may be driven at an increased speed with respect to their usual operation speed. This may be realized by the controllable drives of the elements and aggregates. For example, the drive of the grating conveyor belt and/or of the curtain pump and/or of the fan may be switched to an increased number of rotations. It is possible to store a cleaning program in the control unit of the coating apparatus.

It is especially desirable to design and arrange the return pump for the mass to be detachable from the return conduit, and to be connectable to one or more hose. The return conduit leading to the reservoir of the tempering apparatus is separated from the return pump of the coating apparatus. One or two hoses are connected to the exit of the return pump. The return pump is designed and arranged in a way to convey both mass and water. The flexible hoses are handled by the operating staff. The hoses have a length such that all locations in the coating apparatus to be cleaned are within reach. The return pump is used as conveying pump for the water. It is not desired to mechanically clean the aggregates and elements of the coating apparatus using water at high pressures, but instead, the water rinses the aggregates and elements of the coating apparatus to be cleaned at a low pressure. Consequently, the rests of the mass sticking to the aggregates and elements of the coating apparatus are melted off instead of being mechanically removed. It is understood that the cleaning time may be reduced when a plurality of hoses is used.

Instead of using the return pump which is always part of a coating apparatus, a separate water pump may be connected to the tub and to one or more hose, The handling of the hoses has already been described above.

The curtain pump may include a pole changing motor or a frequency changer to change the number of rotations and closeable discharge opening at the deepest location of its housing. The discharge opening of the curtain pump is closed while the coating apparatus is cleaned with water since the filling of the tub circulates through the coating apparatus. Consequently, the consumption of water is reduced. At the end of the cleaning process using water, the discharge opening is opened, and the water including the melted mass is pumped out of the housing of the curtain pump.

The coating apparatus may include a plurality of easily detachable aggregates, especially the curtain case, the conduit, the cover of the base case, the vibration apparatus, the tale off device and the like, to make the cleaning process of the aggregates and elements of the coating apparatus more effective.

The coating apparatus may be designed and arranged such that an effective drying process may follow the cleaning process using water. For this drying process, the return pump is separated from the coating apparatus. The discharge opening of the curtain pump is opened. During the drying process, the grating conveyor belt, the mixing screw and the curtain pump are driven. The fan of the coating apparatus preferably is adjusted to its maximum power. During the drying process, the double housing of the coating apparatus is heated.

The novel cleaning process takes less time and provides an improved cleaning result compared to the prior art. Additionally, there is no danger of the operating staff handling the hoses get dirty or wet.

Other objects, features and advantages of the present invention will become apparent to one with skill in the art upon examination of the following drawings and the detailed description. It is intended that all such additional objects, features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
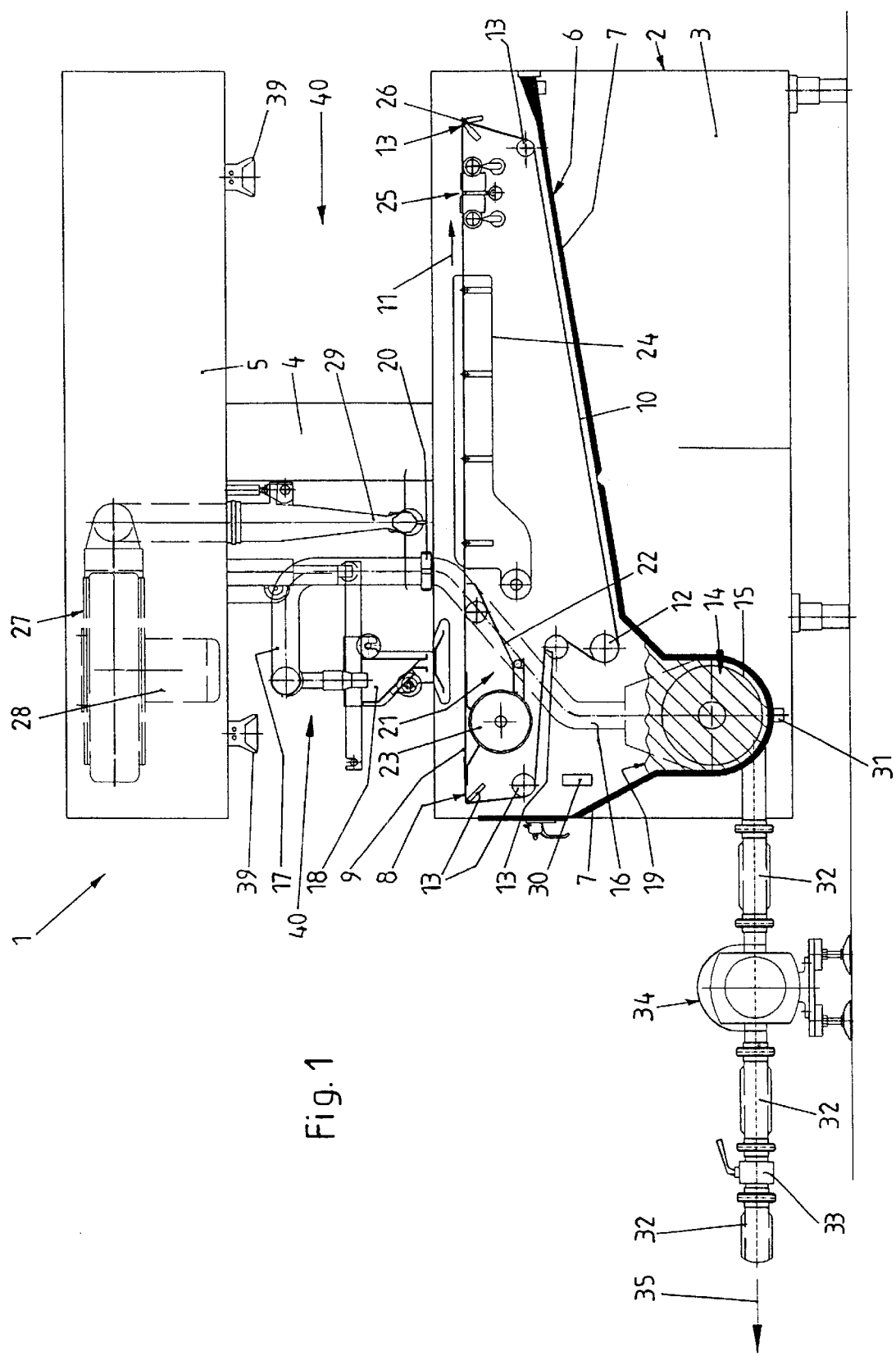
FIG. 1 is a schematic side plan view of a coating apparatus during its production mode.

Referring now in greater detail to the drawings, FIG. 1 illustrates a coating apparatus 1 including a frame 2 carrying a table-like lower part 3 in which the essential elements of the coating machine 1 are arranged. The lower part 3 at its upper end is connected to a column-like structure 4 carrying an upper part 5 in which aggregates are arranged.

A tub 6 is arranged in the lower part 3. The tub 6 serves to hold surplus chocolate mass being utilized above the tub 6. The tub 6 includes a double housing 7 being connected in a known way to a heatable water circuit (not illustrated). It is also possible that the double housing 7 includes a plurality of sections. The double housing 7 usually serves to heat the tub 6 to prevent chocolate mass getting in contact to the tub from coagulation during the production process.

A grating conveyor belt 8 is arranged inside the lower part 3 and in the upper region of the tub 6, the conveyor belt 8 having an upper portion 9 and a lower portion 10. The grating conveyor belt 8 is driven to rotate according to arrow 11. The drive is realized by a driving roller 12 and a motor or an engine (not illustrated). The grating conveyor belt 8 is guided by a number of deflecting elements 13 partly being designed as rollers and partly being designed as cutting edges. The chocolate mass being located inside the tub 6 during production is taken by a curtain pump 14 including a mixing screw 15, and it is guided into a conduit 17 via an ascending pipe 16. The ascending pipe 16 is connected to a curtain case 18 from which the chocolate mass freely falls down onto the articles to be coated (not illustrated) being located on the grating conveyor belt. In this way, the articles are coated with chocolate or a similar mass. Surplus mass flows down or drips down through the grating conveyor belt 8, and it is collected in the tub 6. The mass flows in an downward direction toward the lowest portion of the tub. Then, the mass may be pumped out of the tub 6 by the curtain pump 14, again. During the production process, a mass level 19 occurs. The conduit 17 is connected to the ascending pipe 16 by a swivel nut 20 to be easily detachable from the ascending pipe 16.

A base covering station 21 is arranged at the entrance of the coating machine 1 in front of the curtain case 18 and below the upper portion 9 of the conveyor belt 8. The base covering station 21 includes a base case 22 having a tub-like design. A base roller 23 is rotatably driven in the base case 22, the base roller 23 taking mass out of the base case 22 and throwing the mass in an upward direction through the upper portion 9 of the grating conveyor belt 8 such that the articles being located on the upper portion 9 of the grating conveyor belt 8 are also coated with chocolate in the region of their bottom or of their base. The base case 22 is fed with chocolate mass falling down from the curtain case 18. The base case 22 includes an overflow through which surplus mass may enter the tub 6 to reenter the circulation.

A vibrating apparatus 24 for the upper portion 9 of the grating conveyer belt 8 is arranged after the base covering station 21 as seen in the direction of arrow 11. A base strickle shaft 25 and a tale off device 26 are arranged after the vibration apparatus 24 as seen in the conveying direction according to arrow 11. The vibration apparatus 24 serves to take liquid chocolate mass off the articles and off the grating conveyor belt 8. The tale off device 26 serves to take chocolate mass off the end of an article to prevent protrusions or tales at the articles. The tale off device 26 includes a driven shaft being easily detachable. The curtain case 18 is also designed and arranged to be easily removable. Elements of the vibration apparatus 24 and cover plates as they are used in the upper region of the base case 22 of the base covering station 21 may also be removed. A plurality of radiant heaters 39 is arranged in the covering chamber 40 being located above the upper portion 9 of the grating conveyor belt 8 to keep this region sufficiently warm.

A fan 27 is arranged in the upper part 5. The fan 27 is driven by an engine 28. The fan 27 sucks in ambient air, and it blows the ambient air over the articles being covered by the mass via a nozzle 29, so that the liquid portion of the mass is blown off the articles. Consequently, the desired thin coating of the articles is attained.

A level sensor 30 is arranged inside the tub 6 above the driving roller 12. The level sensor 30 does not fulfil a function during production, but it is used during the cleaning process. The curtain pump 14 being arranged down in the tub 6 includes a discharge opening 31 which can be opened and closed by a device, for example by a valve (not illustrated). The discharge opening 31 is closed during the production process. A return conduit 32 is connected to the lowest part of the tub 6 and to the curtain pump 14, respectively. A manually operable valve 33 and a return pump 34 are arranged in the return conduit 32. The elements of the return conduit 32 are connected by easily operable swivel rings or fast couplings.

FIG. 1 illustrates the relative position of the elements of the coating apparatus 1 at the end of a production process before the chocolate mass is conveyed to return to the beginning of the process. The valve 33 is switched to its passage position, and the return pump 34 is actuated, so that the chocolate mass is conveyed from the tub 6 according to arrow 35 into a reservoir for the chocolate mass (not illustrated). The heating of the double housing 7 of the tub 6 is still active, or its temperature is even increased in case the coating apparatus 1 has to be cleaned before a different chocolate mass enters the coating machine 1.

Figure 2:
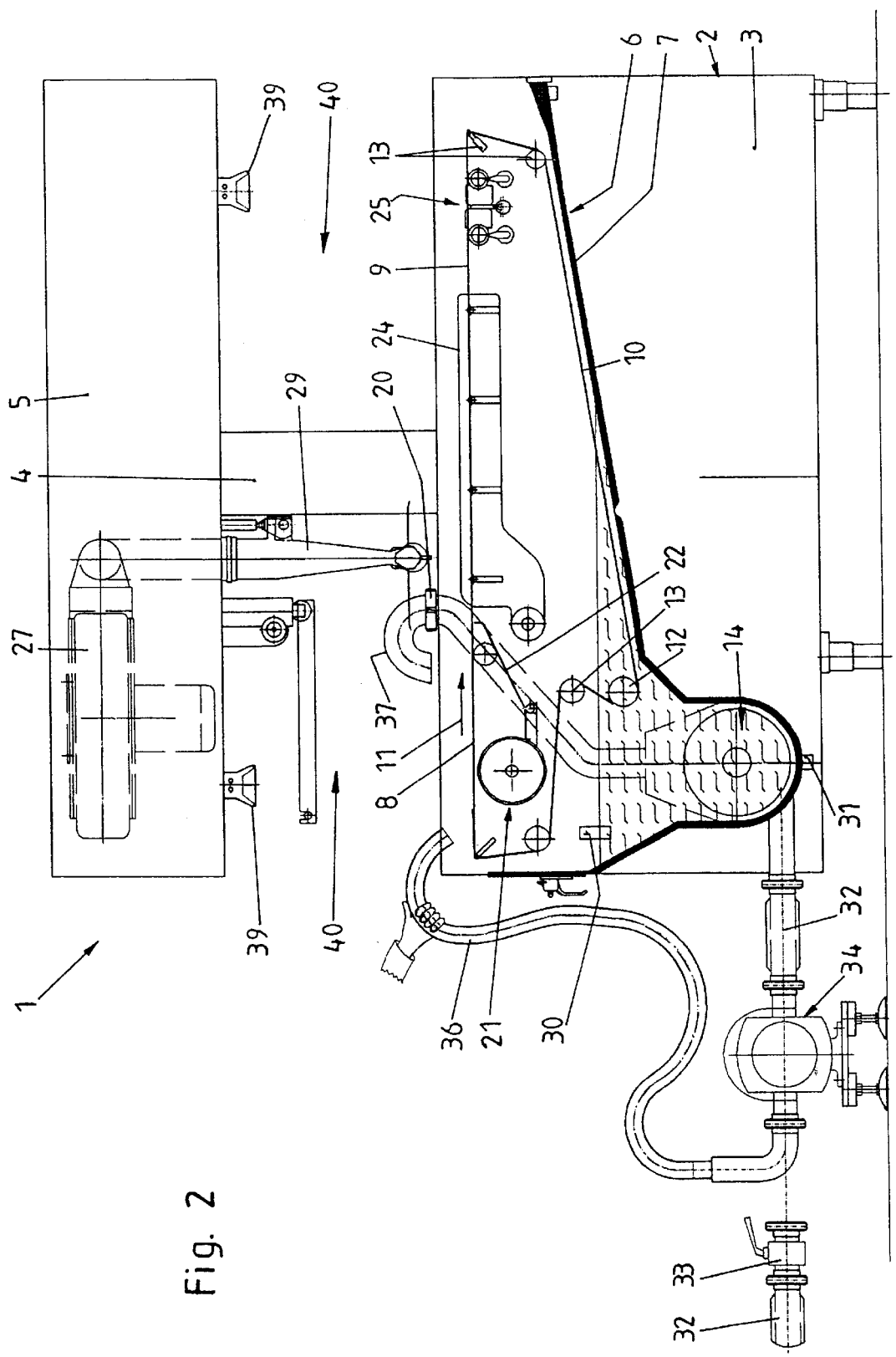
FIG. 2 is a schematic side plan view of the coating apparatus while it is cleaned with water.

FIG. 2 illustrates the elements of the coating apparatus 1 during a cleaning operation with water. The valve 33 is closed, and a section of the return conduit 32 is disconnected from the return pump 34, and it is removed. A hose 36 is connected to the pressure side of the return pump 34, the hose 36 having a length such that all aggregates and locations of the coating apparatus 1 above the tub 6 are within reach. The curtain case 18 being easily removable from the coating apparatus 1 and the tale off device 26 are removed. The swivel nut 20 has been opened, and the conduit 17 has been removed. Instead, a pipe bend 37 is connected, the pipe bend 37 being designed and arranged such that its outlet is directed onto the base case 22.

Before the cleaning action begins, the tub 6 is filled with warm water until the water level is above the driving roller 12 for the grating conveyor belt 8. The signal of the level sensor 30 ends the filling action of the hot water. Then, the coating apparatus 1 and especially the driving roller 12 and the curtain pump 14 are actuated. The grating conveyor belt 8 rotates. The grating conveyor belt 8 moves through the hot water, so that chocolate sticking to the grating conveyor belt 8 and to the driving roller 12 is melted and washed off. The hot water is also carried on by the grating conveyor belt 8 to get in contact to the deflecting rollers 13, so that the deflecting rollers 13 also have a temperature such that the chocolate sticking thereto is melted and washed off. During this substantially unpressurized circulation of the hot water and/or after a certain operation time, the return pump 34 may be actuated such that hot water also streams out of the hose 36. The operating staff may direct the water flowing out of the hose 36 directly onto the aggregates to be cleaned to melt the chocolate and to wash the chocolate off the aggregates to be cleaned. This is true for all elements being arranged in the upper region of the tub 6. The removed parts, especially the curtain case 18, the conduit 17 and the tale off device 26 are cleaned outside the coating apparatus 1. A comparison of FIGS. 1 and 2 shows that the hot water is filled into the tub 6 up to the level sensor 30, meaning substantially higher than the chocolate mass with its mass level 19 during production. This difference is necessary to make sure that the driving roller 12 is completely covered with water to be cleaned thoroughly. The driving roller 12 is an element to which the chocolate mass sticks to a great extent during production. Since the substantially unpressurized or pressureless rinse procedure takes place during the substantial aggregates are driven, for example, shafts and deflecting rollers 13 are also cleaned at their bottom sides by the cleaning liquid. With this rinsing operation, the chocolate mass is melted and washed off the elements to be cleaned. The filled in water remains in the circuitry, and it remains hot since it is heated by the double housing 7. The elements being arranged within the tub 6, for example the return pump 34, also have the temperature of the hot water, so that they are also cleaned. The same is true for the curtain pump 14 with its mixing screw 15. To speed up the washing process and the rinsing process, the grating conveyor belt 8 and the curtain pump 14 may be driven at an increased speed.

As soon as all chocolate mass of the coating apparatus 1 is melted and liquefied and all aggregates and elements are cleaned, the hot water including the melted chocolate mass is pumped out of the system, for example into a reservoir, using the return pump 34 and the hose 36. Finally, it is also possible to open the discharge opening 31 of the curtain pump 14 to drain the remainder of hot water out of the tub 6.

Figure 3:
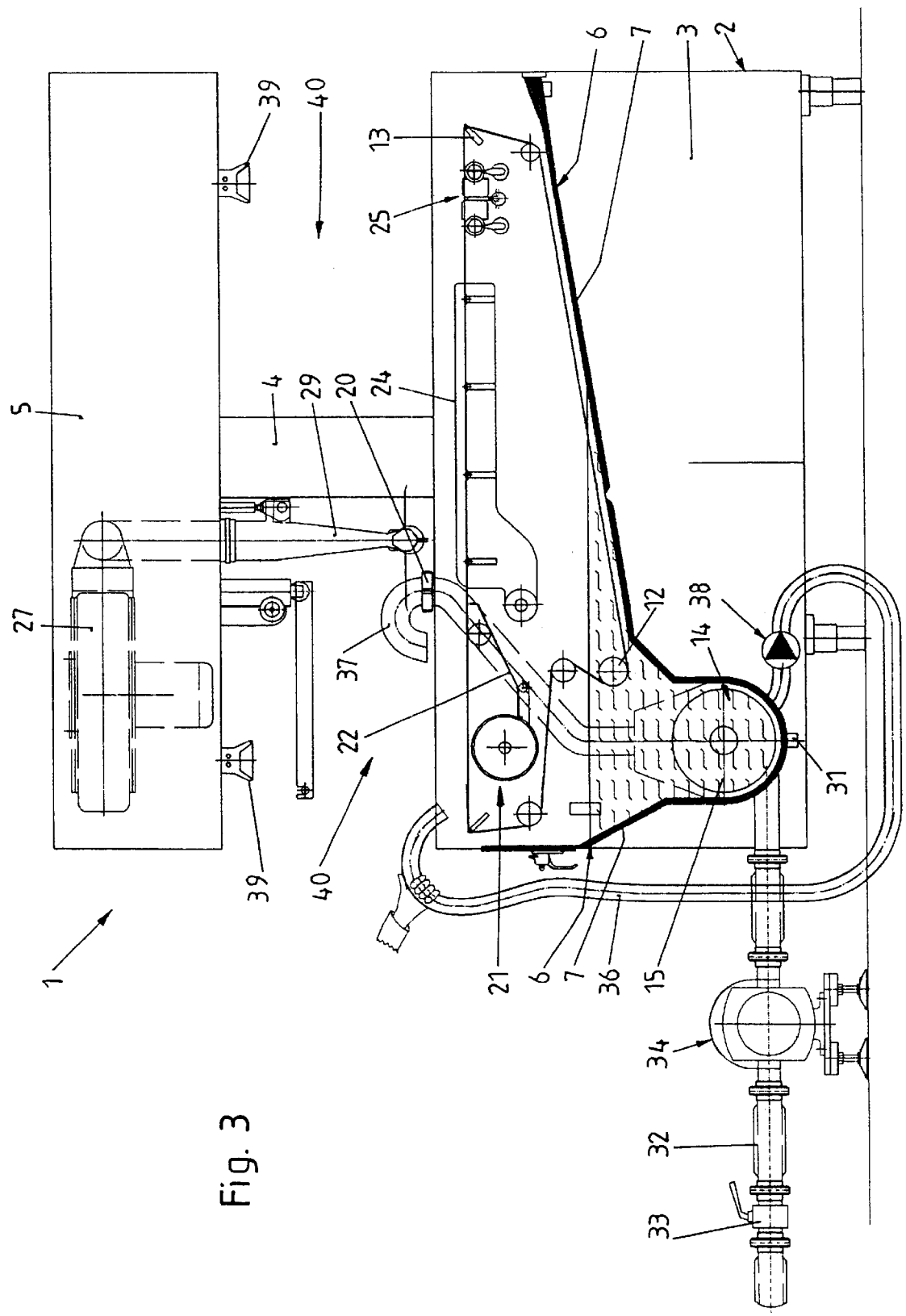
FIG. 3 is a schematic side plan view of a second embodiment of the coating apparatus while it is cleaned with water.

The embodiment of the coating apparatus 1 illustrated in FIG. 3 has a lot of similarities to the embodiment described with respect to FIGS. 1 and 2, so that it is referred to that description. A separate water pump 38 being especially designed to pump water is provided. The water pump 38 is connected to the hose 36, and it fulfils the function of the return pump 34 during the cleaning process. In this embodiment, the return pump 34 only serves to pump the chocolate mass out of the coating apparatus 1 at the end of the coating process. The return pump 34 is separately cleaned, as it is also true for the curtain case 18 and other elements, for example the conduit 17.

Figure 4:
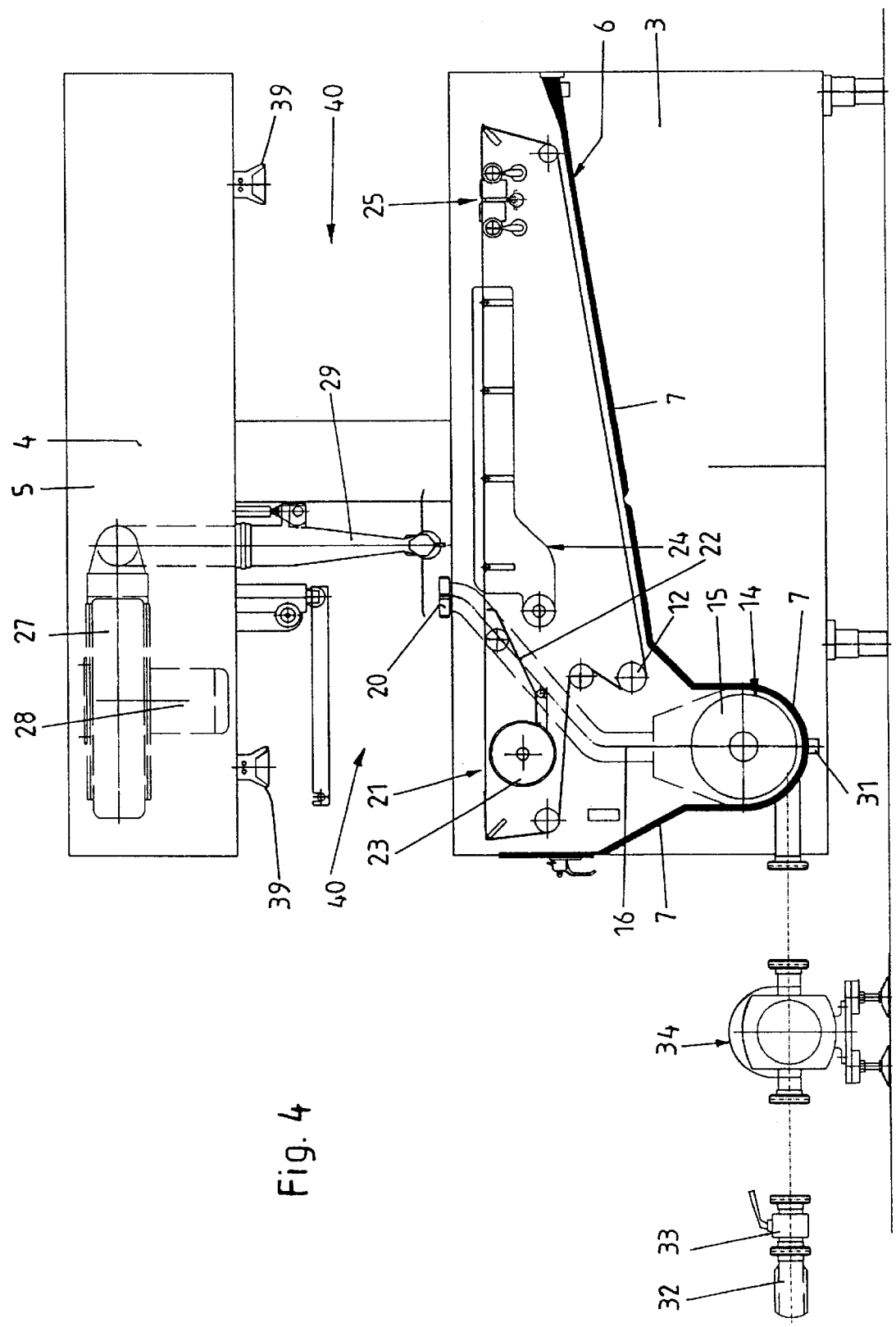
FIG. 4 is a schematic side plan view of the first embodiment of the coating apparatus while it is dried.

FIG. 4 illustrates a coating apparatus 1 according to FIGS. 1 and 2. The coating apparatus 1 is illustrated during a following drying operation. The hose 36 is also disconnected from the return pump 34. Additionally, sections of the return conduit 32 have been removed such that the heated return pump 34 may dry. The discharge opening 31 of the curtain pump 14 is opened. The grating conveyor belt 8 is still driven. The hot water and the melted chocolate is removed from the coating apparatus 1. The fan 27 is actuated. Preferably, the fan 27 is actuated at a high speed. By the fan 27, air is directed onto the elements of the coating apparatus 1 to dry them. The electric radiant heater 39 remains actuated. During the drying process, the double housing 7 of the tub 6 is still heated until the elements are dry. The curtain pump 14 is also dried since it is still heated and air coming from the fan 27 streams over it. It is understood that the elements of the coating apparatus 1 being located outside the coating apparatus 1 are also dried before they are reattached to the coating apparatus 1 to attain their position as illustrated in FIG. 1. Then, the new mass for coating articles may be filled into the coating apparatus 1, and the coating apparatus 1 may begin its coating operation.

Figure 5:
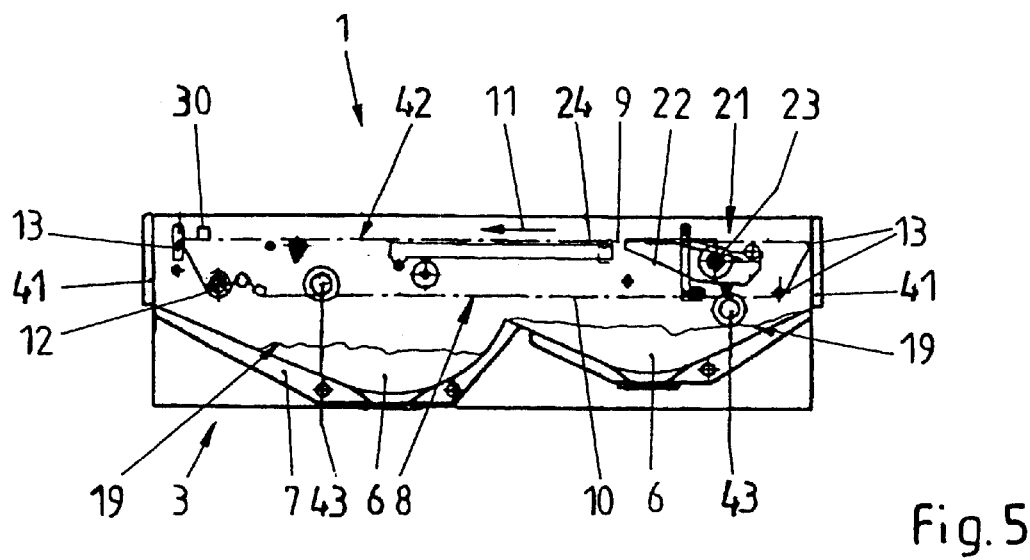
FIG. 5 is a schematic side plan view of a portion of the second embodiment of the coating apparatus.
Figure 6:
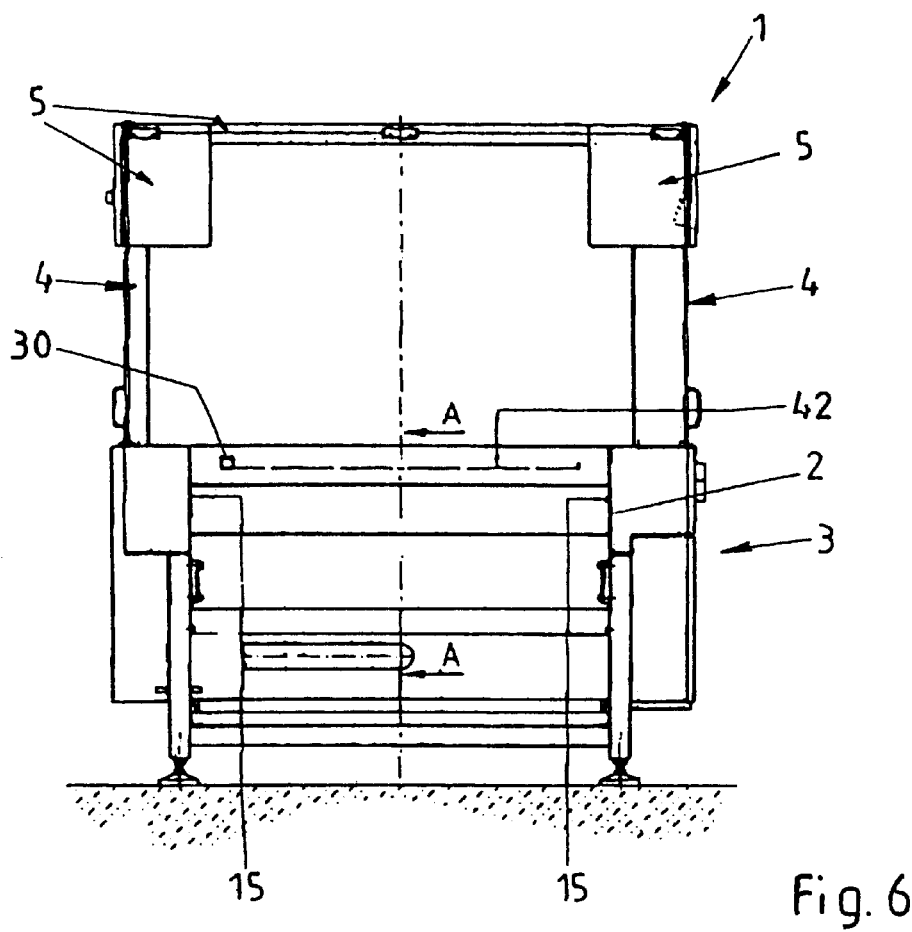
FIG. 6 illustrates a schematic front plan view of the second embodiment of the coating apparatus.

The coating apparatus 1 illustrated in FIGS. 5 and 6 has a similar structure to the coating apparatus 1 illustrated in FIGS. 1 to 4. It is referred to the description of the embodiments of FIGS. 1 to 4.

It can be seen from FIGS. 5 and 6 that the tub 6 includes a raised side wall 41. A part of the side wall 41, especially in the front regions of the entrance and of the exit of the coating apparatus 1, is designed as removable cover elements to make it possible to connect conveyor belts for the articles or other elements during the normal production process. The side wall 41 is designed as a closed loop to surround the upper portion 9 of the grating conveyor belt 8. Thus, the tub 6 may be filled with water up to a water level 42. Reaching the water level 42, the upper portion 9 of the grating conveyor belt 8 is also covered with water. One or more ultrasonic transmitter or sonotrode 43 is arranged inside the tub 6 below the water line 42. Each ultrasonic transmitter 43 serves to additionally clean the elements to be cleaned by sending ultrasonic waves into the hot water.

A base covering station 21 is arranged at the entrance of the coating apparatus 1 in front of the curtain case 18 and below the upper portion 9 of the grating conveyor belt 8. The base covering station 21 includes a base case 22 having a tub-like design. A base roller 23 is arranged in the base case 22, and it is driven to take the mass out of the base case 22, and to throw the mass through the upper portion 9 of the grating conveyor belt 8 in an upward direction such that the articles being located on the upper portion 9 of the grating conveyor belt 8 are also covered with chocolate in the region of their bottom. The base case 22 of the base covering station 21 is fed by the surplus mass falling down from the curtain case 18. The base case 22 includes an overflow through which surplus mass gets back into the tub 6 and back into the circuitry.

FIG. 5 illustrates the relative position of the elements of the coating apparatus 1 and the ending of the production before the chocolate mass is conveyed back. After the chocolate mass is removed from the coating apparatus 1, the tub 6 is filled with hot water, for example water having a temperature of approximately 45° C. The level sensor 30 watches the filling action, and it ends the filling action. The hot water is guided over the aggregates and the elements of the coating apparatus 1 to be cleaned by one or more pumps (not illustrated) to circulate substantially unpressurized. During this cleaning action, the aggregates of the coating apparatus 1 to be cleaned and the grating conveyor belt 8 are driven. The heating of the double housing 7 of the tub 6 is still actuated, or it is brought up to a higher temperature when the coating apparatus 1 has to be cleaned before a new mass enters the coating apparatus 1. To even improve the cleaning effect, the ultrasonic transmitters 43 are actuated. Additionally, cleaning substances and fat solvents may be added to the hot water. In this way, there are three cleaning effects, i.e. the rests of chocolate are washed off by melting, by mechanically removing due to waves and by solving fat due to the solvent.

Since the substantially unpressurized rinsing action takes place while the substantial aggregates and the grating conveyor belt 8 of the coating apparatus 1 are driven, shafts, rollers and deflecting elements are also cleaned at their bottom sides. The chocolate mass is melted and washed away. The water circulating in the coating apparatus 1 remains hot since it is heated by the double housing 7. The elements being arranged inside the tub 6 and, for example, the pump also have the temperature of the hot water, so that they are also thoroughly cleaned. To speed up the washing and rinsing action, the grating conveyor belt 8 and the curtain pump are driven at an increased speed compared to their normal operation speed.

After the entire chocolate mass of the coating apparatus 1 is melted, and after all aggregates and elements of the coating apparatus 1 are clean, the hot water including the melted chocolate mass is pumped out of the coating apparatus 1 utilizing the pump or the water pump. For example, the hot water is pumped into a reservoir. Then, the tub 6 may be filled with hot-water having a temperature of approximately 65 to 80° C. Again, the level sensor 30 ends the filling action. The hot-water is also used to conduct a washing and rinsing action. Using the hot-water, the aggregates and elements of the coating apparatus 1 are even more heated up than it is the case in the above described rinsing action utilizing hot water of approximately 45° C. After the hot-water has exited the coating apparatus 1, it evaporates at the hot aggregates and elements of the coating apparatus 1, so that the coating apparatus 1 dries.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of cleaning a coating apparatus for coating articles with chocolate masses with hot water, said method comprising the steps of:

filling water into a tub of the coating apparatus, wherein the coating apparatus includes a driven grating conveyer belt for receiving the articles to be coated including a upper belt portion and a lower belt portion, and wherein the coating apparatus includes at lest one aggregate being arranged in the upper region of the tub;

pumping water out of the tub with at least one pump; and directing the substantially unpressurized water onto the grating conveyer belt and onto the at least one aggregate to be cleaned, the water having a temperature being higher than the melting temperature of the mass, the water flowing over the grating conveyer belt and the at least one aggregate and back into the tub in a substantially unpressurized manner.

2. The method of claim 1, wherein the hot water is circulated to flow from the tub to the grating conveyer belt and to the at least one aggregate and back into the tub.

3. The method of claim 1, wherein in the step of filling the water into the tub of the coating apparatus the tub is filled with water up to a water level such that the upper portion of the grating conveyer belt is located below the water level.

4. The method of claim 1, wherein in the step of directing the substantially unpressurized water onto the grating conveyer belt and onto the at least one aggregate to be cleaned the hot water is directed onto the grating conveyer belt and onto the at least one aggregate by at least one hose.

5. The method of claim 4, further comprising the step of driving the grating conveyer belt and the at least one aggregate while the substantially unpressurized hot water is directed onto them.

6. The method of claim 1, wherein the tub includes a double housing, and wherein the double housing is heated up to a temperature such that the hot water has a temperature which is higher than the melting temperature of the mass.

7. The method of claim 1, further comprising the step of adding a solvent to the water.

8. The method of claim 1, further comprising the step of adding a fat solvent to the water.

9. The method of claim 1, further comprising the step of exciting the water by introducing ultrasonic waves into the water.

10. The method of claim 1, further comprising the steps of:

pumping the hot water out of the coating apparatus;

filling fresh hot-water of approximately 65 to 80 degrees Celsius into the tub;

pumping hot-water out of the tub with at least one pump;

directing the substantially unpressurized hot-water onto the grating conveyer belt and onto the at least one aggregate to be cleaned, the hot-water flowing over the grating conveyer belt and the at least one aggregate and back into the tub in a substantially unpressurized manner; and pumping the hot-water out of the coating apparatus;

wherein the hot-water evaporates at the hot grating conveyer belt and at the at least one aggregate to be cleaned.

11. The method of claim 1, wherein the aggregates to be cleaned are a curtain station including a curtain pump and a conduit and a base station including a base case.

12. The method of claim 11, further comprising the steps of:

replacing the conduit of the curtain station by a pipe bend being directed on the base case of the base station;

driving the grating conveyer belt and the curtain pump while they are cleaned.

13. The method of claim 1, wherein the coating apparatus further includes a fan.

14. The method of claim 13, further comprising the step of drying the grating conveyer belt and the at least one aggregate by directing air with the fan thereon.

* * * * *